United States Patent [19]

Grutzediek et al.

[11] 3,765,012

[45] Oct. 9, 1973

[54] ANALOG-DIGITAL CONVERTER UTILIZING MULTIPLE RAMP INGEGRATING TECHNIQUES

[76] Inventors: Hartmut Grutzediek, Hausberge; Joachim Scheerer, Robert-Bosch-Strasse 3, Frankenthal, both of Germany

[22] Filed: Mar. 22, 1972

[21] Appl. No.: 237,058

[30] Foreign Application Priority Data

Mar. 24, 1971 Germany .................. P 21 14 141.3

[52] U.S. Cl. ............................................ 340/347 NT

[51] Int. Cl. ............................................ H03k 13/02

[58] Field of Search ............... 340/347 NT, 347 AD; 235/183; 324/99

[56] References Cited

UNITED STATES PATENTS

| | | | |
|---|---|---|---|
| 3,582,947 | 6/1971 | Harrison | 340/347 NT |
| 3,458,809 | 7/1969 | Dorey | 340/347 NT |
| 3,686,665 | 8/1972 | Elias | 340/347 NT |

*Primary Examiner*—Maynard R. Wilbur
*Assistant Examiner*—Jeremiah Glassman
*Attorney*—Flynn & Frishauf

[57] ABSTRACT

An analog current $I_1$, to be digitized is fed continuously to the input of an integrator. Two pulse counters, serially connected, algebraically count pulses from a pulse generator, the first pulse counter of the two setting, upon overflow, a bistable element to one of its states. The bistable element will remain in the state until either one of two conditions occur: (a) A threshold switch connected to the output of the integrator commutates or (b) the first pulse of the pulse generator, after change-over of the threshold switch occurs. The first condition (a) occurs when the second pulse counter is at a predetermined, for example final state of its count; the second condition (b) occurs in all other cases. In accordance with the state of the threshold switch, the bistable flip-flop circuit permits either a current $I_2$, or a current $I_3$ (the two currents being of opposite polarity) to be applied, simultaneously with the current $I_1$ to the integrator by suitable switches during predetermined time intervals W. The time interval W is defined as the sum of the time intervals occurring between two successive overflow pulses of the second counter, during which $I_2$ is simultaneously integrated with current $I_1$, less the sum of the time intervals during which current $I_1$ is integrated with current $I_3$. A digital value corresponding to the analog value of current $I_1$ is then stored, in the form of pulse counts, in a counter.

9 Claims, 5 Drawing Figures

$$(A):\quad U_{j,k} - \frac{1}{c}\int_0^{t_{j,k}\cdot\gamma} (I_3 + I_1)\,dt \leq 0 \qquad \text{for } 1 \leq j < N$$

$$(B):\quad U_{j,k} - \frac{1}{c}\int_0^{(t_{j,k}-1)\cdot\gamma} (I_3 + I_1)\,dt \geq 0 \qquad \text{for } 1 \leq j < N$$

$$(C):\quad U_{N,k} - \frac{1}{c}\int_0^{t_{N,k}\cdot\gamma} (I_3 + I_1)\,dt = 0$$

$$(D):\quad t_{j,k} = \text{entier}\left(\frac{c}{\gamma}\cdot\frac{\pm U_{j,k}}{I_3 + I_1} + 1\right) \qquad \text{for } 1 \leq j < N$$

$$W_k = \gamma\cdot\sum_{j=1}^{N} t_{j,k} \qquad \ldots\ldots\ldots\ldots\ldots (E)$$

$$(F):\quad R_k = \gamma\cdot\sum_{j=1}^{N} s_{j,k} \quad \text{with } s_{j,k} = \frac{I_1}{I_1 + I_3}\cdot(s_{j-1,k} - T)$$

$$\text{for } 1 \leq j \leq N \text{ and } s_{o,k} \equiv s_{N,k-1}$$

$$\left|\frac{R_k}{\gamma} - \frac{W_k}{\gamma}\right| < 1 \qquad \ldots\ldots\ldots\ldots\ldots\ldots (G)$$

$$\lim_{k\to\infty} s_{j,k} = -T\cdot\frac{I_1}{I_3} \qquad \ldots\ldots (H) \text{ and therefore}$$

$$\lim_{k\to\infty} R_k = -\gamma\cdot N\cdot T\cdot\frac{I_1}{I_3}\ . \qquad \ldots\ldots\ldots\ldots\ldots\ldots (I)$$

$$W_k = \gamma\cdot N\cdot T\cdot\frac{I_1}{|I_2|} \qquad \ldots\ldots\ldots\ldots (J)$$

$$-\frac{1}{3}\left|I_2\right| < I_1 < +\frac{1}{3}\left|I_3\right| \qquad \ldots\ldots\ldots\ldots (K)$$

$$R_k = \left\{\left(s_{N,k-1} + \frac{T\cdot I_1}{I_3}\right)\left(1 - \left[\frac{I_1}{I_1 + I_3}\right]^N\right) - N\cdot T\right\}\frac{I_1}{I_3}\cdot\gamma \quad \ldots (L)$$

FIG. 5

ANALOG-DIGITAL CONVERTER UTILIZING MULTIPLE RAMP INGEGRATING TECHNIQUES

The present invention relates to an analog digital converter utilizing multiple ramp integrating techniques. More specifically, the converter operates with an amplifier and an integrating circuit which continuously integrates an electrical quantity, typically a current $I_1$. After constant time intervals, the current is integrated together with either one of two oppositely poled currents $I_2$ or $I_3$, for defined periods of time, utilizing a threshold switch. A pulse generator, pulse counters, logic and bistable elements are utilized to transfer pulse values occurring during the integration time to a counter in which a digital value representative of an analog current value is stored.

Analog-digital converters have been used to digitally measure electrical quantities, such as current, voltage, resistance and the like; they are used for example in digital measuring instruments, process control, and similar systems. The analog value is converted into a number which can be counted, the count being recorded in a counter which sums the duration of time intervals after a predetermined number of intervals which will then correspond to the digitzed value of a measured analog quantity.

When integrators are used in digital-analog converters, it has been customary to switch the input signal off for certain periods during operation of the apparatus (see for example German Pat. Nos. 1,258,453; 1,288,632; 1,295,629; 1,150,537). This disadvantage can be avoided (see for example U.S. Pat. No. 3,458,809 corresponding to German Pat. No. 1,289,101) but at the cost of relatively long time periods during measurement. It takes a fairly long time until a final, asymptotic digital value with the required level of accuracy has been obtained after iterative procedures. For instance, a step of an input current from 0 to ⅔ of maximum value, stipulated by requirements of convergence, requires for a relative accuracy of $10^{-6}$, a length of time which is so great that other techniques can carry out up to about 20 single measurements (assuming the same pulse generator frequency and integrating time). All these methods and systems of the referred to patents additionally require sophisticated or complicated integrator and threshold or comparator circuits in order to obtain adequately high resolution and linearity. Assuming an integrating time of one second, and an integrator with a linearity of $10^{-6}$ up to about 5 V output, the threshold circuit must then sense a change in voltage of less than 5 $\mu$ V /$\mu$ sec. None of the known methods and systems permit continuous integration to obtain a digital value without time gaps.

It is an object of the present invention to provide a digital to analog converter in which the integrator, and associated circuitry such as comparators, threshold circuits and the like can be of lesser linearity or accuracy; to provide rapid convergence of the digitizing process, even by relatively large jumps in input signals; to record a complete integral of input current, uninterrupted by breaks in time, which would otherwise be required by the system or the method; and to use only circuitry which is required to switch only constant analog signals, in contrast to prior apparatus.

Subject matter of the present invention: Briefly, an integrator-amplifier has an analog current $I_1$ continuously applied thereto. This is the current which is to be converted to a digital value. A pair of series connected impulse counters constantly count the pulses derived from a pulse generator. At each overflow of the first impulse counter, a bistable element such as a flip-flop is controlled to change state. The flip-flop resets, or changes back, if (a) the threshold switch connected to the integrator changes state or, if (b) the first pulse from the pulse generator occurs after the threshold switch has changed state. The first condition (a) also requires that when the second pulse counter reaches a certain predetermined one of its N possible count conditions, in a preferred form the last count condition. The second condition (b) occurs in all other cases.

The bistable flip-flop permits, in one of its two conditions, to have the integrator conjointly integrate one or the other of a pair of currents of reverse polarity $I_2$ or $I_3$ together with the current $I_1$ (by controlling suitable switches). Which one of the two currents $I_2$, or $I_3$ is integrated will be determined by the instantaneous position of the threshold switch (or comparator) connected to the integrator. A value W defines the sum of the time intervals of the duration of time intervals during which the second pulse counter counts to its predetermined value, that is, during which the current $I_2$ is additionally integrated together with the current of $I_1$, less the sum of the time intervals during which the current $I_3$ is additionally integrated with the current $I_1$ upon the same number of counts being counted by the second pulse counter. If the currents $I_2$ and $I_3$ are suitably selected, and specifically suitably selected with respect to the current $I_1$, the value W will, after few complete counting operations of the second pulse counter only, remain constant.

In accordance with a feature of the invention, the currents $I_2$ and $I_3$ are of the same value and are constant. The bistable element or flip-flop, upon each overflow of the first counter, will be placed in the position in which one of the two switches is closed, so that the circuit to the current is closed and the switch is conductive. The value W, after only a few cycles of the second counter, will then always be proportional to the relationship of the current $I_1$ to current $I_2$.

The ratio of the value of the current $I_1$ to current $I_2$ is recorded by counting the pulses from the pulse generator during the integration occurring when currents $I_1$ and $I_2$ are combined. This count is carried out in forward direction. During integration of current $I_3$ with current $I_1$, the counter counts in reverse direction. The storage or recording, or accumulator counter, which is a bi-directional counter will then, after the second pulse counter has counted to its predetermined value, and in the time interval between two additional integrating steps of the currents $I_2$ or $I_3$ with current $I_1$, have a count value of V, which count value, if desired, can be applied to a utilization device, for process control, can be signalled in a communication network or the like. The counter, in advance of the next, additional integration of the currents $I_2$ or $I_3$ together with the current $I_1$ to be measured can be reset to 0. The value V will then be proportional to the value W, and thus to the ratio of the current $I_1$ to the current $I_2$.

The current $I_1$ itself may be a sum of a current $I_c$ and a current $I_e$, the current $I_e$ to be transformed to digital values. The bistable element is placed in the condition in which one of the two switches interconnecting the currents $I_2$ and $I_3$ are conductive upon overflow of the first pulse counter. The value W, after only a few cycles of the second pulse counter, will then remain constant.

The present invention has the advantage that the requirements with respect to linearity of the integrator, and with respect to sensitivity of the threshold switch are substantially reduced. Thus, the threshold switch can be less sensitive by two orders of magnitude (about 100 times less) as otherwise required upon similar control by an integrator. The integrator itself can operate at much lower levels of integration, again by about two orders of magnitude with respect to the prior referred to integrators, considering the sensitivity of the threshold switch to remain constant.

The digitizing process is carried out with more rapid convergence than in the processes disclosed for example in the aforementioned reference, German Patent No. 1,289,101. The integral of the input current is recorded without time gaps required by the measuring process itself and, only analog switches which switch constant and even analog signals are required in the apparatus itself.

The invention will be described by way of example with reference to the accompanying drawings, wherein:

FIG. 5 is a list of mathematical formulae which will be referred to in the specification in connection with the explanation and the mathematical basis for the present invention, and which are reproduced in drawing form for ease of reproduction and reading.

Figure 1:
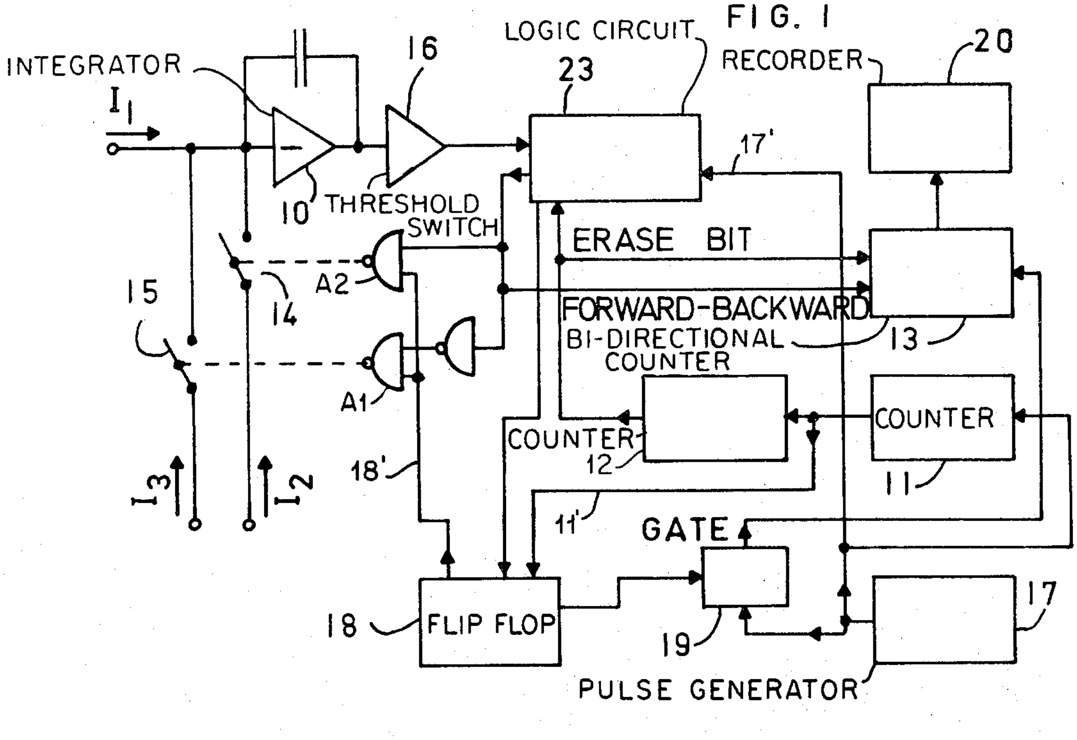
FIG. 1 is a schematic block circuit diagram of a first embodiment of the invention.

The current to be digitized, $I_1$ (FIG. 1) is applied to an integrating amplifier 10. A pulse generator 17 in the nature of a clock pulse generator provides pulses to a pair of series connected pulse counters 11, 12. These counters, physically, may be one single assembly. Upon overflow of counter 11, a pulse is applied to line 11' which switches the state of a bistable flip-flop 18 into one of its stable states. Flip-flop 18 can be reset by a logic circuit 23 into its other stable state. The logic circuit 23 provides a pulse to the flip-flop under two conditions. The output of integrator 10 is connected to a threshold switch 16 which provides one input to the logic circuit 23. The reset pulse output applied to flip-flop 18 occurs under one condition (a) when threshold switch 16 changes state upon passing of its switching threshold or, for another condition (b) when the first pulse from pulse generator 17, applied over line 17' to the logic circuit occurs after the threshold switch 16 has changed state. An additional condition for change of state of the flip-flop 18, as determined by the output of the logic circuit 23 for condition (a) to occur is, that the second counter 12 has reached a predetermined one of its count states. A preferred predetermined count state is the last possible count of counter 12 of its N possible counting states. The second condition (b) occurs in all other cases.

Figure 2:
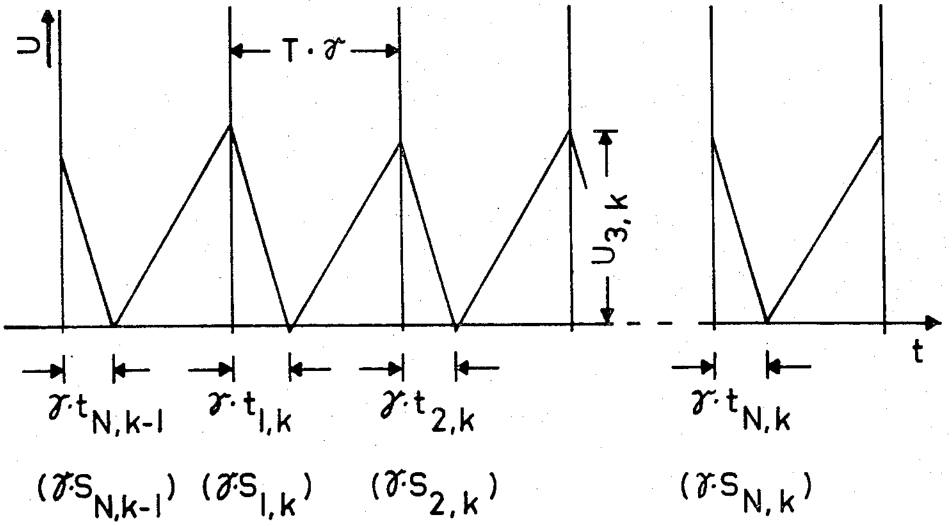
FIG. 2 is a mathematical graph to assist in the mathematical explanation of the operation of the present invention.

Flip-flop 18 will apply an output signal over line 18' to a pair of AND-gates A1, A2 which, in turn, control closing of switches 14, 15, respectively. Closing of the switches, that is, energization of lines 18' will occur when the flip-flop 18 is brought into the set condition, that is, after overflow of the first pulse counter 11. The time period during which this occurs is indicated in FIG. 2 by $t_{j,k} \cdot \gamma$. The start of this time interval $t_{j,k} \cdot \gamma$ , as above described, is determined by the time taken for overflow of the first pulse counter 11. The information, which permits either of of the switches 14 or 15 to be closed, that is, to be conductive, is determined by the AND-gates A1 and A2, respectively, which are in turn controlled by the output from logic circuit 23, and will depend on the state of the threshold switch 16 at the instant of time of overflow of the first pulse counter 11.

The quantities and the symbols in the following discussion can be defined as follows:

$\gamma$ is the duration of one period of the pulse generator (17), $t_{j,k} \cdot \gamma$ is the interval of time when $I_2$ or $I_3$ is integrated simultaneously with $I_1$ at the $k^{th}$ measurement and at the content $j$ of the second pulse counter (12). T is the number of counts in the first pulse counter 11, and N is the number of possible counts of the second pulse counter 12. As additional conditions, $$0 \leq t_{j,k} \leq T$$

and $$1 \leq j \leq N$$

and where $t_{j,k}$ is a whole number, where $1 \leq j < N$ $t_{0,k} = t_{N,k-1}$.

FIG. 2 illustrates the output voltage U of integrator 10 with respect to time if current $I_1$ is negative and current $I_3$ is positive during the time interval $t_{j,k} \cdot \gamma$. In this graph, the abscissa, or time axis intersects the voltage axis at the threshold voltage of the threshold switch 16. If $U_{j,k}$ is the difference of integrator and threshold voltage at the start of time interval $\gamma \cdot t_{j,k}$, then relationships A, B and C of FIG. 5 will result.

Since $t_{j,k}$ is an integer, formulae A and B of FIG. 5 can be written as formula D, FIG. 5 wherein, entier $(x)$ is the maximum integer $\leq x$.

The unknown quantity $W_k$ is given in formula E, FIG. 5. It can be compared with the quantity $R_k$, defined in formula F of FIG. 5. This is the sum of the integrating intervals $\gamma \cdot s_{j,k}$ if their end periods, or limits are defined by the jump, or commutation of the threshold switch 16 in each of the N states of the second pulse counter 12. To determine the limit of $W_k$, it is sufficient to know the limit of $R_k$, because the relationship set forth in G, FIG. 5, will be determinative.

With the above definitions of $R_k$ and $s_{j,k}$, as a geometric progression, condition $|I_1| < |I_3/2|$ and sign $I_1$ = − sign $I_3$ gives formulae H and I of FIG. 5. Finally, convergence of the digital quantity $W_k$ to the limit value $-\gamma \cdot N \cdot T \cdot I_1/I_3$ is obtained. The currents $I_2$ and $I_3$ will have the same value. To determine the time intervals, $\gamma \cdot t_{j,k}$, a bidirectional counter 13 is provided. This counter is reset at the overflow of the second pulse counter 12. It starts counting during the time intervals $\gamma \cdot t_{j,k}$ — the pulses from pulse generator 17, counting forwardly, during the simultaneous integration of the currents $I_2$ and $I_1$. It counts backward during the simultaneous integration of the currents $I_3$ and $I_1$. The bidirectional counter 13 will have the value $W_k$ therein before the next erase or reset bit is obtained from the second counter 12; just before erasing or resetting, the content of counter 13 is transferred to a storage device 20, such as a recorder, a register, an indicator, or other utilization device, such as an input to a control system.

After convergence of the process, the relationship of formula J, of FIG. 5 is obtained, automatically, and with the correct sign, that is, the value $W_k$ has been obtained.

The behavior of convergence will be considered. Let the current values $I_1$, and $I_2$ and $I_3$ have the relationship set forth in formula K of FIG. 5. Let it further be assumed that at the start of the first measurement, current $I_1$ jumps from value ZERO to the value $+ 1/3 |I_3|$. Let it further be assumed that $N=100$ and $T=3 \cdot 10^6$. Substituting, one obtains from equation L of FIG. 5, that $R_2 = R_\infty (1-10^{-32})$. Even in such an unusual, and unfavorable sudden jump of input voltage, the error at the second measure will be so small that it can be neglected.

Figure 3:
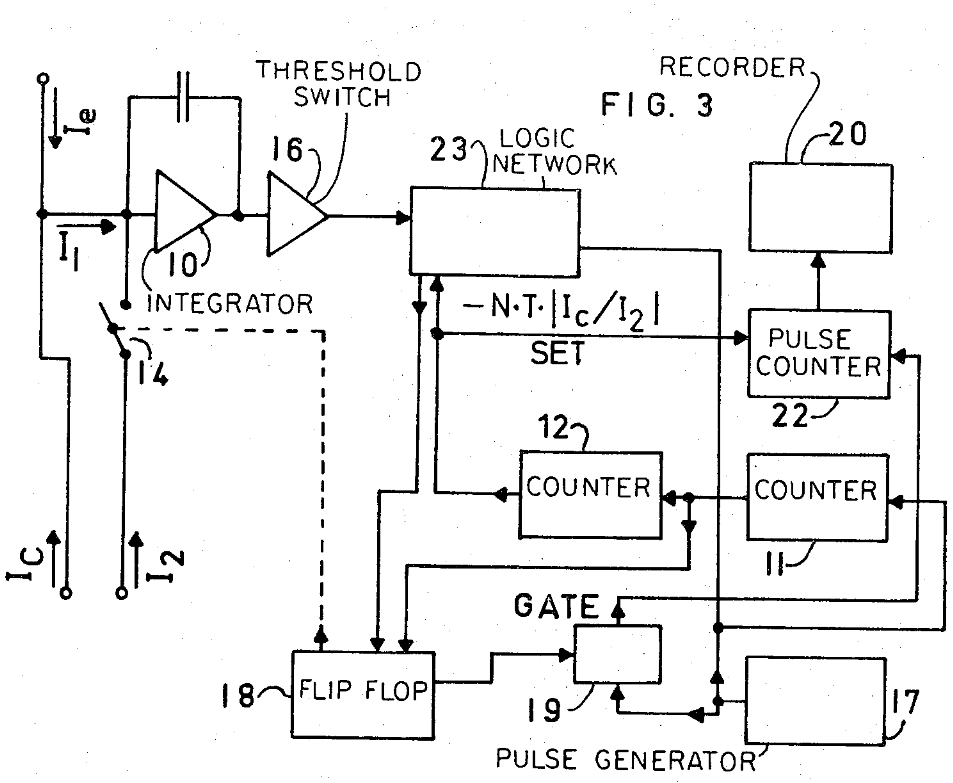
FIGS. 3 and 4 are schematic block diagrams of two further embodiments of the invention.

The embodiment of the invention shown in FIG. 3 is similar to that shown in FIG. 1 (and like parts are not explained again and have been given the same reference numerals) but the bi-directional counter 13 need not be used. Only a single pulse counter 22, counting only in forward direction, is required. Current $I_1$ is formed of a current $I_e$, the one whose digital value is to be determined and a current $I_c$. Current $I_c$ is so selected that the combined current $I_1$ will, at all times, be of positive polarity. The current $I_2$ is of a polarity opposite to that of current $I_1$, that is, in the example negative. The flip-flop 18 is placed as in the example of FIG. 1. It need control only a single switch 14, however, which is closed each time when the first counter 11 overflows. The pulses of pulse generator 17, during simultaneous integration of current $I_2$ and current $I_1$ are then counted by the forward counter 22. Pulse counter 22, upon beginning of a new cycle of the second counter 12 is set to the content $- N \cdot T \cdot |I_c/I_2|$. Before overflow of the second pulse counter (12) the content of the pulse counter 22 will have a value X which again is read out into storage counter or recorder 20.

Mathematically, the value W , in the mathematical computation with respect to the first example, can be replaced by a value $X + N \cdot T |I_c/I_2|$. $I_1$ is replaced by $I_e + I_c$. The value X, at the most after a few cycles of the second pulse counter 12 will have a value which is proportional to the ratio of the current $I_e$ and $I_2$.

Figure 4:
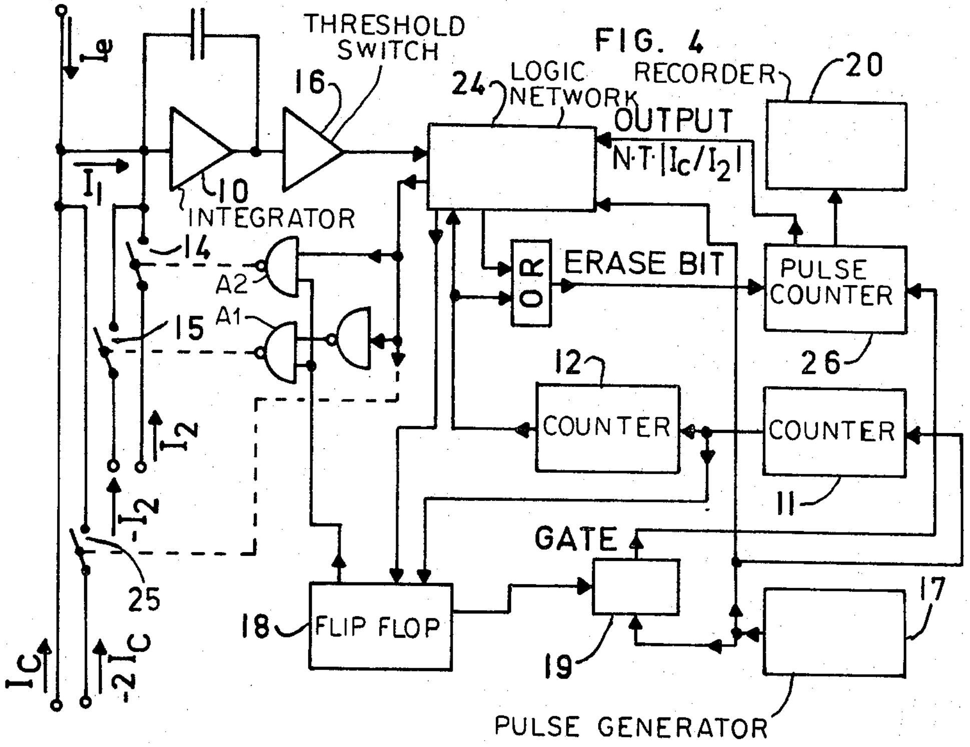

Instead of a pulse counter 22 which starts to count at the value $- N \cdot T \cdot |I_c/I_2|$, a pulse counter 26 as in FIG. 4 can be used if the polarity of the currents $I_3$ and $I_c$ is the same. Such a counter will start to count from the value ZERO and during a cycle of the second pulse counter 12, upon first reaching the value $N \cdot T |I_c/I_e|$ is reset once more to ZERO by a modified logic circuit 24. If the range of values of the current $I_e$ is fairly substantial, so that it is difficult to satisfy the relationship of a single polarity of $I_1$, as above defined, due to the constant value of the current $I_e$, then the embodiment of FIG. 3 is preferably expanded as shown in the example of FIG. 4. In addition to the current $I_e$, one of two currents is added continuously to current $I_e$ which has a polarity equal to the current $I_e$. This then permits a current $+I_c$ to flow at all times and, instead of the current $-I_c$, to add a current of $-2 I_c$ over a switch 25. As in the first described example in connection with FIG. 1, for additional simultaneous integration of the now also permitted reverse polarity of current $I_1$, an additional current of $-I_2$ is required, which can be connected over the switch 15 (FIGS. 1, 4). The information, with respect to which one of the two switches 14 or 15 are to be closed upon change of state of flip-flop 18 is applied to the switches 14, 15, and 25, over a gate within the logic network 24 which is set at the beginning of a measuring cycle upon overflow of the second counter 12 and from the state of the last preceding measuring, that is, if since the last overflow of the second counter 12, the pulse counter 26 has at least once reached the value of $N \cdot T \cdot |I_c/I_2|$, or whether this value has not been obtained. If in the affirmative, then the logic circuit will render effective this specific one of the switches 14, 15, upon the next overflow of the second pulse counter 12, as in the preceding measuring cycle. If the last preceding count in the pulse counter 26 did not, however, reach the value of $N \cdot T \cdot |I_c/I_2|$, then logic circuit 24 will, for the duration of the next subsequent measurement, energize the other of the two respective switches 14, 15, for operation by flip-flop 18. Switch 25 is so switched that it is constantly conductive during simultaneous integration of current $I_1$ if the polarity of the current $I_e$ requires the addition of current $-2 I_c$, so that the respective one of the currents $- I_2$ or $+ I_2$ will have the same polarity as $I_c$. Corresponding to the second example (FIG. 3) the pulse counter 26 can transfer the value of X into the recorder 20. This value X is, after at the most a few cycles of the second pulse counter 12, proportional to the ratio of the current $I_e$ to $I_2$. The sign of $I_e$ can be determined from the switch position of switch 25.

Various changes and modifications may be made within the inventive concept.

We claim:

1. Analog-digital converter comprising an integrator (10) having an analog input signal ($I_1$, $U_1$) continuously applied to the input thereof and continuously integrating the signal;

means applying an auxiliary signal ($I_2$, $I_3$; $I_c$) to the integrator to cause the integrator to simultaneously integrate both the analog input signal and the auxiliary signal;

a threshold switch (16) connected to the output of the integrator and changing state after the integrated output has reached a predetermined value;

a pulse generator (17) providing output pulses;

a first pulse counter (11), a bistable element (18), and a second pulse counter (12).

the first and second pulse counters (11, 12) being connected in series and to the pulse generator to permanently count pulses of the pulse generator and the first pulse counter (11) being connected to set, at each overflow, the bistable element (18) into one of its stable states;

and a logic network (23) connected to the threshold switch (16), the pulse generator (17), the second counter (12) and connected to and controlling the bistable element (18) to reset to its other stable state by the output from the logic network (23), the logic network (23) providing an output if:

a. the threshold switch (16) changes state and the second pulse counter (12) has reached a predetermined count state; or b. in all cases not included in (a), upon occurrence of the first pulse from the pulse generator (17) after a change of state of the threshold switch (16) has occurred;

the bistable element (18), when set upon overflow of the first counter (11) connecting said means applying the auxiliary signal to the integrator to provide an integrated representation of said auxiliary signal to the threshold switch (16) during the time interval said bistable element is in its set state;

a third pulse counter (13, 22, 26) connected to said pulse generator and counting pulses from said pulse generator and having control connections with said logic network;

a pulse count recording means (20) connected to said third pulse counter (13, 22, 26);

the logic network providing a further output (c) controlling transfer of the count from said third pulse counter (13, 22, 26) to said pulse count recording means (20) and resetting said third pulse counter (13, 22, 26) during the time intervals corresponding to two successive overflow pulses of the second counter (12) and during simultaneous integration of the analog input signal and said auxiliary signal.

2. Converter according to claim 1, wherein the third pulse counter is a bi-directional counter (13), the auxiliary signal is formed by a pair of currents ($I_2$, $I_3$) of opposite polarity, and said counter counts in forward direction to count the sum of time intervals occurring between two successive overflow pulses of the second counter (12) when the auxiliary signal of one polarity is integrated with the analog input signal, and the counter counting in reverse, substracting directions when the auxiliary signal of opposite polarity is simultaneously integrated with the analog input signal.

3. Converter according to claim 2, wherein the auxiliary currents ($I_2$, $I_3$) are of constant and equal value and of opposite polarity;

a pair of control switches are provided, each connecting either of the oppositely poled auxiliary signals to the analog input signal, the logic circuit means controlling the closing of the respective control switch in dependence on the sign of the analog input current ($I_1$).

4. Converter according to claim 3, wherein the control switch interconnecting the auxiliary signal is opened under control of said bistable element (18) upon overflow of the first pulse counter.

5. Converter according to claim 2, wherein the bi-directional counter is reset for a new measurement upon each overflow pulse of the second pulse counter (12).

6. Converter according to claim 1, wherein the auxiliary signal comprises a pair of currents ($I_2$, $I_3$) of constant and equal value, and of opposite polarity;

and the third counter comprises a bi-directional counter (13) and means applying the pulses from the pulse generator (17) to the bi-directional counter to be summed therein;

a pair of switch means (14, 15) selectively connecting one or the other of the pairs of currents ($I_2$, $I_3$), the bi-directional counter being interconnected with said logic network and the count direction being determined by said logic network, said count direction being in forward direction when one of said switch means is closed to provide an auxiliary current of the same polarity as that of said analog input signal, and the bi-directional counter being controlled to count backwards when the auxiliary current being applied to the integrator is of the opposite polarity to that of said analog input signal;

means interconnecting the bi-directional counter (13) to erase the counter for a new count measurement upon occurrence of each overflow pulse of the second pulse counter (12);

and means reading out the state of the bi-directional counter (13) of a value V at the end of a cycle of said second pulse counter (12) to obtain an output pulse count (V) which is proportional to the value W of the analog-digital signal to store the value of said signal in digital form.

7. Converter according to claim 1, including a current source ($I_c$) of substantially constant current, the current source adding the constant current to the analog input signal ($I_e$) to obtain a composite analog input signal ($I_1$);

means controlling said bistable element (18) to set after overflow of pulses of said first pulse counter (11), said bistable element interrupting application of the auxiliary signal ($I_2$), whereby, after several cycles of the second pulse counter (12) the pulses applied to the pulse counter (22) will, upon each reset of the pulse counter, provide for a constant value.

8. Converter according to claim 7, wherein the additional current ($I_c$) is so dimensioned with respect to the analog input signal ($I_e$) that the modified input signal ($I_1$) always has a positive value;

the auxiliary signal ($I_2$) always has a negative polarity;

and the third pulse counter (22) is a forward-counting pulse counter, connected to said pulse generator (17) and counting the pulses from said pulse generator during the time of simultaneous integration of the derived analog input signal current ($I_1$) and the auxiliary signal current ($I_2$);

the third pulse counter (22) being reset under control of overflow of the second counter (12), the count value in said third forward counting pulse counter (22) upon reset being a digital indicated value of the ratio of the analog input signal ($I_e$) and the auxiliary signal ($I_2$) after a few cycles of counting of the second pulse counter (12);

and means recording the pulse count in said third counting counter (22) in the pulse count recording means.

9. Converter according to claim 8, wherein the means applying an auxiliary signal apply a plurality of auxiliary signals ($I_e$; $-2\ I_c$; $-\ I_2$; $+\ I_2$), the auxiliary signals being selected in accordance with the value of the analog input signal ($I_e$) to be expected to provide a modified input signal ($I_1$) which will always bear a predetermined relationship in absolute value with respect to at least two of said auxiliary signals, said predetermined relationship providing a direction of integration by said integrator (10) which will always be in a certain, predetermined direction, to permit use of a single forward-counting pulse counter device for said pulse counter.

* * * * *